United States Patent [19]

Klop et al.

[11] Patent Number: 4,646,773

[45] Date of Patent: Mar. 3, 1987

[54] BREAKAWAY HOSE COUPLING

[75] Inventors: Elmer P. Klop, Grand Haven; Leo J. LeBlanc, Bloomfield Hills, both of Mich.

[73] Assignee: Enterprise Brass Works, Inc., Muskegon, Mich.

[21] Appl. No.: 824,117

[22] Filed: Jan. 30, 1986

[51] Int. Cl.[4] .............................................. F16K 13/04
[52] U.S. Cl. ................................ 137/68.1; 137/614.03; 251/149.6
[58] Field of Search ........................................ 137/68.1

[56] References Cited

U.S. PATENT DOCUMENTS 3,741,521 6/1973 Tatsuno ...................... 137/68.1 X
3,797,510 3/1974 Torres ............................ 137/68.1
4,449,545 5/1984 Veruor ........................... 137/68.1
4,483,359 11/1984 Robertson ..................... 137/68.1

FOREIGN PATENT DOCUMENTS 2076917 12/1981 United Kingdom .............. 137/68.1

Primary Examiner—Harold W. Weakley
Attorney, Agent, or Firm—Basile, Weintraub & Hanlon

[57] ABSTRACT

A breakaway hose coupling includes axially separable housing sections maintained in coupled relationship with each other by a frangible coupling pin or set screw. Each housing section includes a valve controlled flow passage in which a spring biassed valve closes the flow passage when the housing sections are separated. Valve stems on the respective valves moves into axial abutment with each other as the housing sections are coupled to mutually hold the respective valves open when the housing sections are coupled.

1 Claim, 4 Drawing Figures

BREAKAWAY HOSE COUPLING

BACKGROUND OF THE INVENTION

The present invention is concerned with a coupling operable to detachably coupled two hose sections in fluid communication with each other and operable, upon separation of the coupling, to automatically seal the ends of the respective hose sections.

Such couplings are finding increasing usage in gasoline hose pumps, particularly at self-service stations. With surprising frequency, customers of self-service stations will forget to remove the pump nozzle from the filler pipe of their car before driving off. In these circumstances, the nozzle is quite likely to become jammed in the filler pipe. If the pump is securely anchored, the hose or its coupling to the nozzle will be broken or, if the pump is not securely anchored, the pump may be pulled over, in either case causing a substantial spillage of fuel.

By placing a breakaway coupling in the fuel pump hose, spillage, due to accidents of the type referred to above, is adequately prevented. However, where the hoses are handled by the general public, an inevitable amount of rough usage is encountered which can result in frequent, unintended separation of the couplings. Most of the couplings of this type presently available are difficult to recouple or require a relatively complex reassembly involving the replacement of specialized parts.

The present invention is directed to a breakaway coupling which will remain coupled in the face of rough usage and which, when uncoupled, may be recoupled simply by the replacement of a single frangible shear pin.

SUMMARY OF THE INVENTION

In accordance with the present invention, a breakaway coupling is formed by a pair of housings adapted to be fixedly connected to the ends of the two hose sections which are to be coupled to each other. A flow passage extends axially through each housing. An enlarged coaxial bore at one end of one housing slidably and sealingly receives a cylindrical sleeve projecting from one end of the other housing. The sleeve is formed on its outer side with an annular groove, and a screw received in a threaded radially extending hole in the first housng may be projected into the bore in that housing and into the groove in the sleeve of the other housing to provide a frangible shear pin holding the two housings in their coupled position.

Within the flow passage in each housing is mounted a valve engageable with a valve seat in that passage to block the flow of fluid through the passage. The valve seats in the respective housing face away from each other when the housings are coupled, and valve stems on each valve head project from the valve head toward the other housing. The combined length of the valve stems is greater than the axial distance between the valve seats in the respective housings when the housings are coupled to each other. Thus, as the housings are moved axially toward each other during assembly, the ends of the valve stems in the respective housings abut each other and the valve heads are lifted from their seats as the housings are moved into coupled relationship with each other.

Spring means on each valve bias the valve heads toward their respective seats so that when the coupling is broken and the housings are separated, the valves are seated so as to close the flow passage through the housings to prevent spillage from the hose sections to which the respective housings are coupled.

Other objects and features of the invention will become apparent by reference to the following specification and to the drawings.

IN THE DRAWINGS

DESCRIPTION OF THE PREFERRED EMBODIMENT

Figure 1:
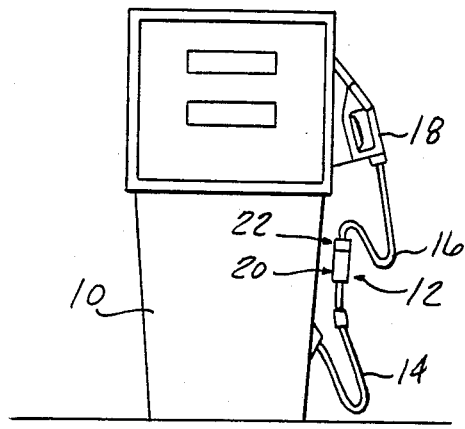
FIG. 1 is a front elevational view showing a gasoline pump with a coupling embodying the present invention installed.

In FIG. 1 there is shown a typical installation employing the breakaway coupling of the present invention. A conventional gasoline dispensing pump 10 is provided with a breakaway coupling designated generally 12 connected between a first section of hose 14 connected to the pump and a second hose section 16 extending from the coupling to the dispensing nozzle 18. Coupling 12 is formed with separable sections 20 and 22 which, in a manner to be described below, normally couple the hose sections 14 and 16 to each other to accommodate flow of fuel from pump 10 to nozzle 18. If, however, an abnormal or unreasonably high force tending to separate hose sections 14 and 16 from each other is encountered, the housing sections 20 and 22 of coupling 12 will separate and, upon separation, valves within each housing section 20 and 22 will close to prevent spillage of fuel from the separated ends of the respective hose sections 14 and 16.

Figure 2:
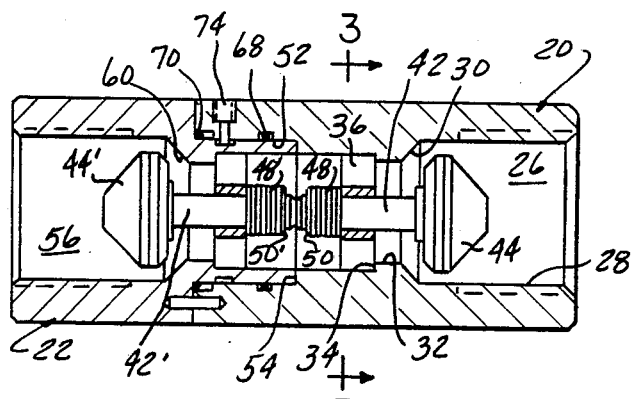
FIG. 2 is a longitudinal cross-sectional view through a coupling embodying the present invention showing the coupling in its assembled or coupled relationship.
Figure 3:
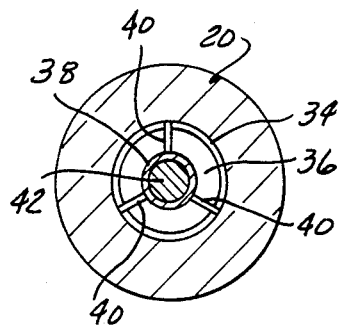
FIG. 3 is a cross-sectional view of the coupling of FIG. 2 taken on the line 3—3 of FIG. 2.
Figure 4:
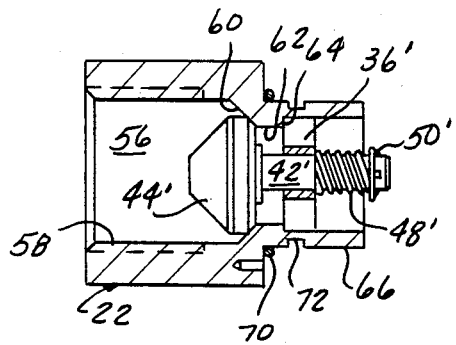
FIG. 4 is a longitudinal cross-sectional view of one of the coupling elements of the coupling of FIG. 2 showing the position of the valve when the element is uncoupled.

Structural details of coupling 12 are best seen in FIGS. 2 through 4.

In FIG. 2 there is shown a longitudinal cross-sectional view through the coupling showing housing sections 20 and 22 in their normal coupled relationship with each other.

Housing section 20 is formed with a central through passage having a large diameter section 26 extending axially into the housing from one end. The outer end of bore 26 is threaded as at 28 for attachment to a conventional hose coupling (not shown) employed to attach housing 20 to a hose section such as 14. At its inner end, bore 26 is formed with a frustoconical valve seat 30 and a small diameter passage 32 forms a continuation of the flow passage defined by the large diameter bore section 26. A radial shoulder 34 facing away from valve seat 30 provides a seat for a valve stem guide 36 which, as best seen in FIG. 3, includes a centrally located sleeve 38 integral with three (or more) radially outwardly projecting arms 40 which locate central sleeve 38 coaxially of the central passage through housing 20. A valve stem 42 is slidably received within sleeve 38 and carries a valve head 44, engageable with valve seat 30, at one end. A compression spring is engaged between a washer-like seat 50 fixedly located on valve stem 42 and the side of valve stem guide 36 located remote from shoulder 34. At the end of housing 20 remote from bore 26, a smooth walled bore 52 extends axially into housing 20 to terminate at a radial seat 54.

Referring now particularly to FIG. 4, housing section 22 is formed with a relatively large diameter bore 56 extending inwardly from one end of housing 22. Bore 56 is threaded as at 58 to enable housing 22 to be attached to a conventional hose coupling to permanently couple housing 22 to one end of a hose section, such as 16 (FIG. 1).

Enlarged bore 56 in housing 22 terminates at its inner end in a frustoconical valve seat 60. A small diameter bore section 62 continues coaxially through the housing from valve seat 60 and, as was the case with housing section 20, a radial shoulder 64 facing away from valve seat 60 is formed in bore 62. A valve stem guide designated generally 36', of construction identical to that of the previously described valve stem guide 36, is seated against shoulder 64 to slidably support a valve stem 42' which carries a valve head 44' normally biased into sealing engagement with valve seat 60 by a spring 48' engaged between a spring seat 50', fixed on valve stem 42', and stem guide 36'.

Housing 22 is formed with a cylindrical sleeve portion 66 at one end which is slidably and sealingly receivable within bore 52 in the mating housing section 20 as best seen in FIG. 2. Suitable O-ring seals such as 68, 70 are employed to form a fluid-tight seal in a well-known manner.

Returning briefly to FIG. 4, an annular groove 72 is formed on the outer side of sleeve section 66 and, when the coupling is assembled as in FIG. 2, a set screw-shear pin 74 is threadably received within a radial bore in housing 20 to project into groove 72 of housing 22 to retain the two housing sections 20 and 22 against axial separation. Displacement of the housing sections 20 and 22 with respect to each other in a rotational direction after the coupling has been assembled is prevented by means of a roll pin of a conventional type, the ends of which extend axially into housing sections 20 and 22 at a point on the juncture between the end of bore 52 and the non-projecting end of housing 22 substantially opposite the position of screw-shear pins 74, as shown in FIG. 2. Set screw-shear pin 74 is formed of a suitable thermoplastic material and is designed to function as a shear pin which will break upon application of a predetermined force acting to axially separate the housing sections 20 and 22.

In the fuel pump application shown in the drawings, the breaking force of set screw 74 is normally designed at approximately 200 pounds, a force which will permit housing sections 20 and 22 to separate before any damaging mechanical strain is applied to other hose connections in the system or to the pump structure. This setting is also high enough to prevent unintended separation of coupling 12 in the face of rough usage as when the nozzle end of the hose is violently pulled toward the filler pipe of a car.

When the housing sections 20 and 22 are separated, the valve heads of the respective housings are biased by the springs 48, 48', against their respective seats to close the flow passages through the respective housing sections, as best seen in the cross-sectional view of the uncoupled housing section 22 in FIG. 4. It is believed apparent that a similar closure will occur in the valve of housing 20.

Referring to FIG. 2, it is seen that the combined lengths of valve stems, 42' is greater than the axial distance between valve seats 30 and 60 when housing sections 20 and 22 are coupled to each other. The opposed ends of valve stems 42, 42' thus abut each other when the housings are coupled and this abutment mutually maintains valve heads 44 and 44' away from their respective seats so that flow through the coupling can occur. Springs 48, 48' are wound in a fashion such that the compression applied to the springs when the housing sections 20 and 22 are coupled will compress the springs to the point such that adjacent coils of the springs are in substantial contact with each other. This arrangement assures that the valve heads 44 and 44' will both be held clear of their respective valve seats when the sections are coupled in the event of a slight mismatch between the characteristics of the springs 48, 48'.

From the foregoing description, it is believed apparent that coupling 12 will function as a fluid coupling between hose sections 14 and 16 (FIG. 1) in normal circumstances. If a force of a magnitude sufficient to break set screw-shear pin 74 is exerted between hose sections 14 and 16, the two sections 20 and 22 of the coupling will separate and, as the couplings separate, the springs 48, 48' will bias their associated valve heads 44 and 44' to a valve-closed position against their respective seats. Thus, upon separation of the coupling, spillage from hose sections 14 and 16 is restricted essentially to that amount of fuel within the coupling between valve seats 30 and 60.

Reassembly of the coupling after a separation requires merely the replacement of the set screw-shear pin 74.

While one embodiment of the invention has been described in detail, it will be apparent to those skilled in the art that disclosed embodiment may be modified. Therefore, the foregoing description is to be considered exemplary rather than limiting, and the true scope of the invention is that defined in the following claims.

We claim:

1. A breakaway coupling for detachably coupling two hose sections in fluid communication with each other, said coupling comprising:

first and second housings, first means at one end of each housing for fixedly coupling the housing to one end of the respective first and second hose sections, second means at the other end of each housing for coupling the housings in detachable end-to-end relationship with each other, said second coupling means including means defining a bore in said first housing extending inwardly from its other end and cylindrical sleeve means projecting axially from the other end of said second housing to be slidably and sealing received in said bore, the outside diameter of the sleeve being sufficiently large to provide a tight fit within the bore, an annular groove in the outer surface of said sleeve means, a single frangible coupling pin projecting radially from said first housing into said groove to releasably retain said housings in coupled relationship with each other, a means for preventing rotational displacement of said housings with respect to each other comprising an axially projecting pin interposed between the end of the said first housing and the non-projecting and of said second housing, valve controlled passage means extending axially through each housing from end-to-end for establishing fluid communication between said hose sections when said housings are coupled to each other by said second means, the passage means in each housing including an annular valve seat facing said one end of the housing, a valve head located between said seat and said one of the housing, a valve stem fixed to the valve head and projecting axially from the head toward the other end of the housing co-axially of said passage means, and spring means biasing the valve head toward the associated valve seat, the combined length of the valve stems in the respective housings exceeding the axial distance between the valve seats in the respective housings when said housings are coupled to each other whereby abutment of the valve stems with each other is operable to maintain the valve heads out of engagement with their associated seats when said housings are coupled to each other to accommodate flow of fluid from one hose section to the other and said spring means are operable to engage said valve heads with their respective valve seats to close the passage means in the housings when said housing are separated from each other, wherein said spring means comprises a valve stem guide slidably supporting said valve stem and seated against a radial shoulder in said passage means facing said other end of the housing, a washer-like spring seat fixedly mounted on said valve stem adjacent the end thereof remote from said head, and a helical compression spring would around said valve stem and engaged between said spring seat and said stem guide, wherein the springs in the respective housings are compressed to a degree such that the coils of the springs are in substantial contact with each other when said housings are coupled to each other.

* * * * *